US005484037A

United States Patent [19]

Neumarkel

[11] Patent Number: 5,484,037

[45] Date of Patent: Jan. 16, 1996

[54] SAWHORSE CONNECTOR

[76] Inventor: Arthur F. Neumarkel, 706 10th St., Mukilteo, Wash. 98275

[21] Appl. No.: 206,407

[22] Filed: May 23, 1994

[51] Int. Cl.$^6$ .................................................. F16M 11/00

[52] U.S. Cl. .......................................... 182/185; 182/224

[58] Field of Search .................................. 182/181–185, 182/224–227

[56] References Cited

U.S. PATENT DOCUMENTS

| | | | |
|---|---|---|---|
| 488,349 | 12/1892 | Bradley | 182/185 X |
| 1,542,048 | 6/1925 | Forester | 182/185 |
| 1,597,555 | 8/1926 | Tolmie | 182/224 |
| 1,908,858 | 5/1933 | Kane | 182/185 |
| 2,559,696 | 7/1951 | Anderson | 182/185 |
| 2,753,222 | 7/1936 | Foresta | 182/224 |
| 3,082,027 | 3/1963 | Johnson | 182/185 X |
| 3,175,642 | 3/1965 | Neeley | 182/185 X |
| 3,547,227 | 12/1970 | Trevino | 182/185 |
| 3,563,343 | 2/1971 | Kramm | 182/224 |
| 3,848,701 | 11/1974 | Hughes | 182/185 |
| 4,192,406 | 3/1980 | Mitchell | 182/185 |
| 4,228,871 | 10/1980 | Koffski | 182/184 |
| 4,299,509 | 11/1981 | Meickl | 403/252 |
| 4,325,463 | 4/1982 | Taylor | 182/155 |
| 4,449,842 | 5/1984 | Reichman, Jr. | 182/185 X |
| 4,565,263 | 1/1986 | Southworth | 182/184 |
| 4,770,274 | 9/1988 | Middleton | 182/185 |
| 4,903,796 | 2/1990 | Magyar et al. | 182/129 |
| 5,020,634 | 6/1991 | Gunderson et al. | 182/184 |

FOREIGN PATENT DOCUMENTS

| | | | |
|---|---|---|---|
| 1731219 | 2/1957 | France | 182/185 |

*Primary Examiner*—Alvin C. Chin-Shue
*Attorney, Agent, or Firm*—Christensen, O'Connor, Johnson & Kindness

[57] ABSTRACT

A connector (12) for use in assembling a sawhorse (6). The sawhorse has an elongate cross member (11) mid four elongate leg members (13) joined together using two connectors. Each connector is manufactured from a tubular center sleeve (7) having a bottom wall and defining an interior passage having a longitudinal axis. The interior passage receives an end of the cross member. The connector also includes first and second tubular leg sockets (8). Each socket defines an interior passage having a longitudinal axis. The first and second sockets are secured in opposing angular disposition to the center sleeve, so that the longitudinal axes of the first and second sockets are disposed radially relative to the longitudinal axis of the center sleeve. Each of the first and second sockets receives an end of one of first and second leg members. The received ends of the first and second leg members bear against the bottom wall of the center sleeve.

4 Claims, 2 Drawing Sheets

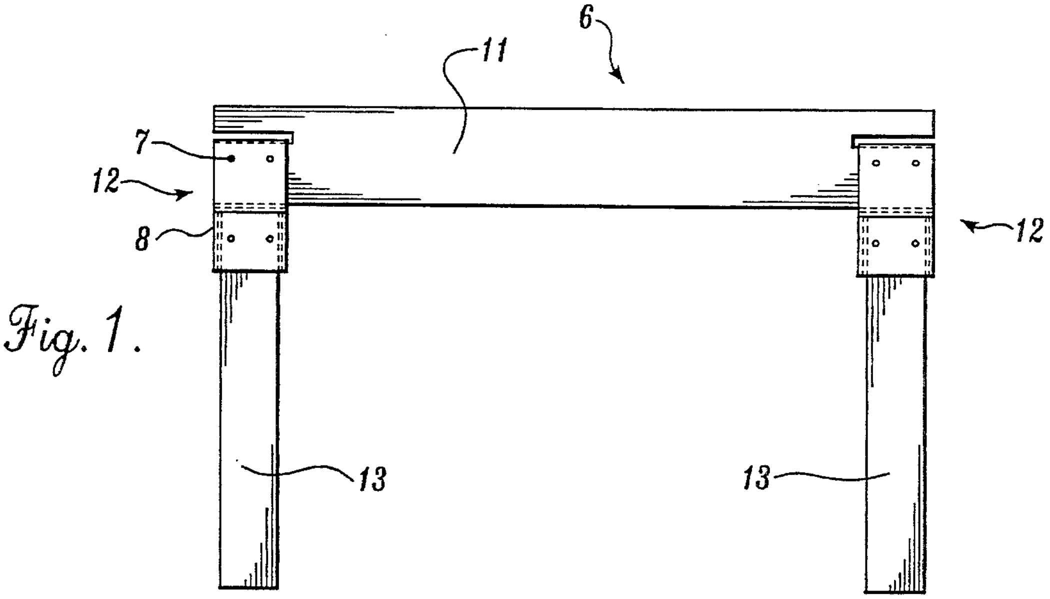
Fig. 1.
Fig. 2.
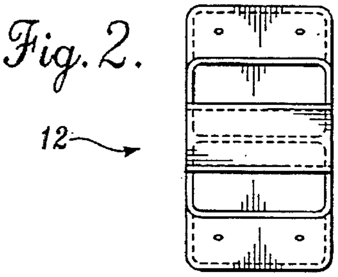
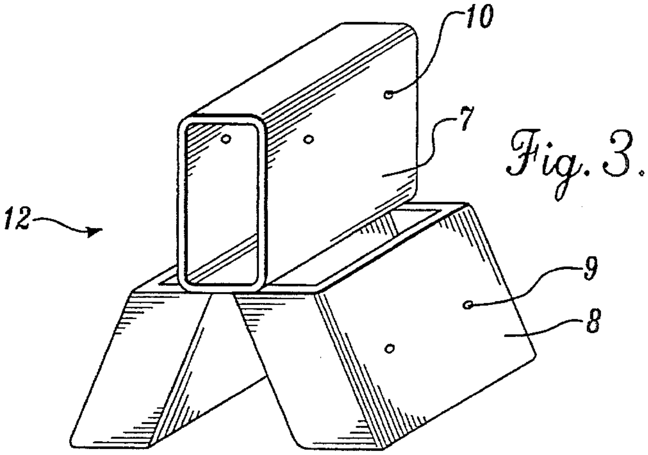
Fig. 3.
Fig. 4.
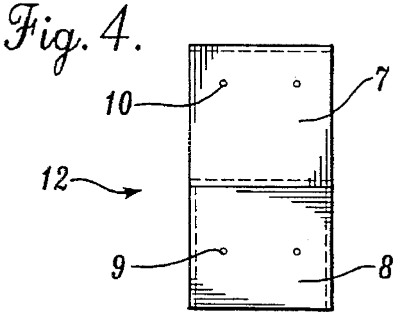
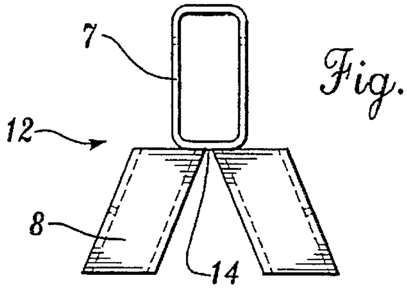
Fig. 5.

SAWHORSE CONNECTOR

FIELD OF THE INVENTION

The present invention relates to sawhorses, scaffolding and barricades for use in the construction industry, and particularly to brackets for connecting structural members together to assemble sawhorses and barricades.

BACKGROUND OF THE INVENTION

In the construction industry it is often necessary to utilize sawhorses for holding lumber that is being cut or otherwise worked. Sawhorses may also be usefully employed as barricades, trestles and racks.

Conventional sawhorses are sometimes constructed from brackets that connect an elevated cross member to four angularly disposed supporting legs. However, conventional brackets have various shortcomings, including difficulty in assembling the structural members employed, and a lack of durability when the sawhorse is impacted. A further problem is that conventional sawhorse brackets rigidly retain the structural members and legs in such a manner that they are inflexible, such that the sawhorse tends to tip when resting on uneven ground surfaces. Because the brackets typically utilize fasteners to secure the brackets to the structural members, the structural members are rigidly retained in orientation. In addition, the durability and reliability of the completed conventional sawhorse is limited by the reliability of the fasteners employed. The integrity of the load bearing capacity of the sawhorse is dependent on the fasteners. Finally, conventional sawhorse brackets and systems are often not easily adapted to handle different lengths of structural members.

It is thus desirable to provide a connector or bracket for a sawhorse that will satisfy the need of the construction industry for durability, reliability, ease and speed of handling, and economy of materials.

SUMMARY OF THE INVENTION

The present invention provides a connector for use in assembling a sawhorse having an elongate cross member and four elongate leg members. The sawhorse utilizes at least two connectors. Each connector includes a center portion defining an interior passage for receiving an end of the cross member, and a wall defining a stop surface. The connector also includes a first socket portion radially secured to the center portion and defining an interior passage having an inner end and a radial outer end. The stop surface of the center portion of the connector at least partially blocks the inner end of the interior passage of the first socket portion. An end of a first leg member is received within the interior passage of the first socket portion, and bears against the stop surface of the center portion. The connector also includes a second socket portion radially secured to the center portion, and defining an interior passage having an inner end and a radial outer end. The stop surface of the center portion of the connector at least partially blocks the inner end of the interior passage of the second socket portion. An end of a second leg member is received within the interior passage of the second socket portion, and bears against the stop surface of the center portion.

In a preferred embodiment, each connector of the present invention is made of tubular sections, each having a hollow rectangular interior which will receive a standard dimensioned 2"×4" wood member, or materials of similar dimensions, for the legs and for the cross member which, when assembled with two or more of the connectors, will complete a sawhorse, barricade, trestle or the like. The term "sawhorse" is used hereinafter to include sawhorses, barricades, trestles and the like. Each connector includes a cross member sleeve and two leg member sockets. The cross member sleeve and leg sockets each are formed from a hollow, rectangular interior tubular section. The sections of tubing which are suitably employed to fabricate the complete connector of the present invention are cut and assembled in such a manner as to provide for all loads to run directly from the cross member sleeve into the leg members without the need for any special fasteners. The two leg sockets are joined at the axial centerline of the sleeve of the cross member. Into the face of each of the two leg sockets are drilled two holes, so that a nail or pin or two may be used to keep the leg members in their proper sockets when being picked up or transported. There are also two holes drilled into each face of the cross member sleeve to receive either one or two nails or pins as desired. The extra holes are merely for convenience. The tubing section which makes up the sleeve for the cross member is placed on edge, oriented so that the cross sectional axis of the leg sockets and the longitudinal axis of the cross member socket are parallel with each other.

The connectors may be used either in pairs or tandem, as needed, to complete the sawhorses. The connectors have no structural dependence upon any fasteners when used to complete the sawhorse. Rather, the component tubes of the connectors are arranged in such a manner that fasteners are used only to make sure the various remaining structural members used to complete the sawhorse are held in their proper place until a load is placed on the completed sawhorse. Any downward load is transmitted in the strongest line of the components used to complete the sawhorse.

The component tubes of the connectors are arranged in such a manner as to transmit and absorb any torsional load as a result of an uneven surface upon which the completed sawhorse is placed. Any racking loads placed on the sawhorse is also resisted by virtue of the tubular sockets and the tubular sleeve components of each connector totally encompassing the other structural members that are used to complete a sawhorse. In each instance, stress placed on any one component of the sawhorse, trestle, barricade or the like is directly transmitted to each of the other components, so that no one component has to bear the total stress of the load experienced by the completed sawhorse.

The connector of the present invention is arranged in such a manner as to minimize the set-up, take-down, transport and storage problems commonly associated with a sawhorse, trestle, barricade or the like. The ultimate size of the sawhorse, trestle, barricade or the like constructed using the bracket of the present invention is limited only by the constraints of the job and the materials used for the components to make up the legs and cross member.

BRIEF DESCRIPTION OF THE DRAWINGS

The foregoing aspects and many of the attendant advantages of this invention will become more readily appreciated as the same becomes better understood by reference to following detailed description, when taken in conjunction with the accompanying drawings, wherein:

FIG. 1 is a side elevation view of a sawhorse assembled using two connectors constructed in accordance with the present invention;

FIG. 2 is a top view of a connector of the present invention;

FIG. 3 a perspective view of the connector of FIGS. 2;

FIG. 4 is a side view of the connector of FIGS. 2 and 3;

FIG. 5 is an end view of the connector of FIGS. 2 and 3;

DETAILED DESCRIPTION OF THE PREFERRED EMBODIMENT

Figure 6:
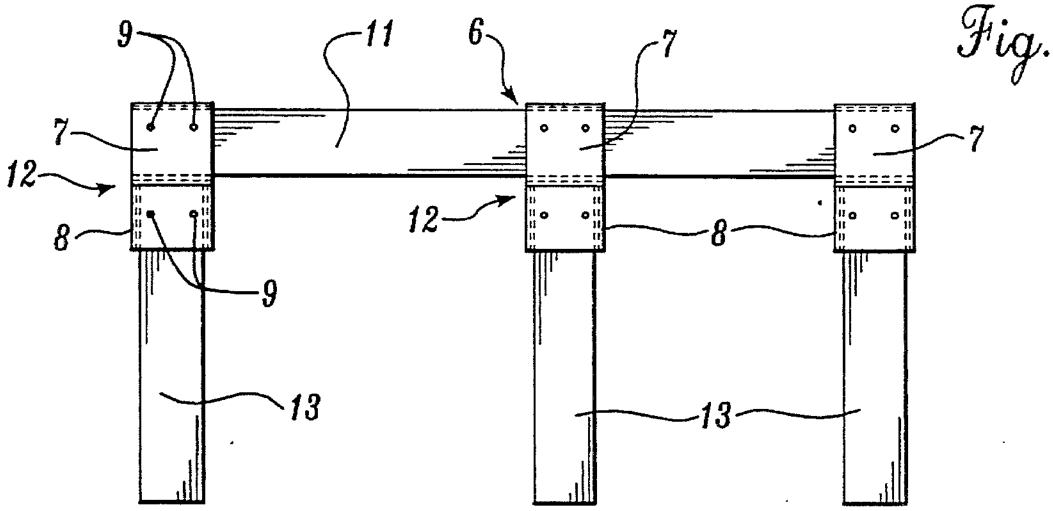
FIG. 6 is a side view of a trestle constructed using three connectors in tandem of the present invention.

FIG. 1 illustrates a preferred embodiment of a completed sawhorse 6 using two connectors 12 constructed in accordance with the present invention. A cross member 11 is suitably a 2"×6" (nominal dimensions) piece of wood with notches cut into each end providing a 1–½" by 3–½" tail (actual dimensions, thus matching the actual dimensions of a nominal 2"×4" milled piece of wood) which is inserted into the sleeve 7. The remaining portion of each notched end of the cross member 11 overlaps the top of the sleeve 7, and serves to protect saw blades from contacting the connectors 12 during cutting of lumber supported on the sawhorse 6, and likewise to protect the connectors 12 from any saw blades. A pair of 2"×4" (or 1–½" by 3–½) pieces of wood are suitably used as leg members 13. One leg member 13 is inserted into each of the leg sockets 8. Each of these members 11 and 13 are kept in place with a nail or two inserted through holes 9 and 10 (FIGS. 3) provided in the connectors 12. Each connector 12 includes a center tubular sleeve 7 to which are welded by whatever means as known to those of ordinary skill in the art or otherwise secured two angularly projecting tubular sockets 8. The sleeve 7 of each connector 12 receives one end of a sawhorse cross member 11. Each socket 8 receives an end of a corresponding leg member 13.

FIGS. 2 and 3 illustrate the axial relationship of sleeve 7 and sockets 8 to one another. The longitudinal axis of the cross member sleeve 7 is parallel with a plane defined by the open ends of the leg sockets 8. The longitudinal axis of each leg socket 8 is oriented perpendicular to the longitudinal axis of the sleeve 7.

FIGS. 2 and 3 also demonstrate that the centerline of the cross member sleeve 7 becomes the orienting criteria for each of the leg sockets 8. Leg sockets 8 are joined with the cross member sleeve 7 at the centerline of the longitudinal axis of the cross member sleeve 7. A longitudinal side face of the sleeve 7 is joined to angled end faces of the sockets 8, resulting in a cantilevered angle orientation of the sockets 8 relative to the sleeve 7. This orientation allows a weld formed at the juncture of the sleeve 7 and sockets 8 to carry the greatest load under tension.

FIGS. 3 and 4 demonstrate the relationship of the faces of the sockets and sleeve to each other, and shows how any lateral shear will be resisted by the encompassing nature of the sleeve 7 and sockets 8 around the received ends of the wood members 11 and 13. This also demonstrates the holes 9 and 10 which are used to insert a nail or pin into the cross member 11 or legs 13.

FIG. 5 demonstrates the location of the weld 14 as it joins the leg sockets 8 to the cross member sleeve 7, and how the weld provides excellent resistance to the tension that might be imposed by the legs 13 wanting to spread.

The cross member 11 and legs 13 find their natural support and restraint when inserted into their respective proper socket or sleeve. The orientation and common joinder of the sleeve 7 and sockets 8 also enables a straightforward manufacturing process to produce the connector 12.

The connector 12 provides ease of assembly and disassembly of the sawhorse 6. The legs 13 and the cross member 11 are merely put into their respective sockets 8 or sleeve 7, and secured with a nail or pin so that the members 11 and legs 13 don't fall out or shift. The connector 12 provides for limitless flexibility in height. The legs 13 may be cut to any length suitable to the job. The connector 12 also provides for the reuse of the legs 13, as they are rarely damaged on the job site.

The connector 12 allows for the use of any length of cross member 11. The cross member 11 may be long enough to create a rack, or short enough to provide for a table substructure. The cross member 11 may be as deep as needed, with either a 2"×4" being used or any other 2" width nominally dimensioned piece greater than the 2"×4" configured to the specific requirements of the job. For example, FIG. 6 illustrates the use of a nominal 2"×4" cross member 11 in place of the nominal 2"×6" cross member of FIG. 1. FIG. 6 also illustrates the use of three connectors 12 slidably received in spaced relationship on the cross member 11 to assemble a long trestle.

Figure 7:
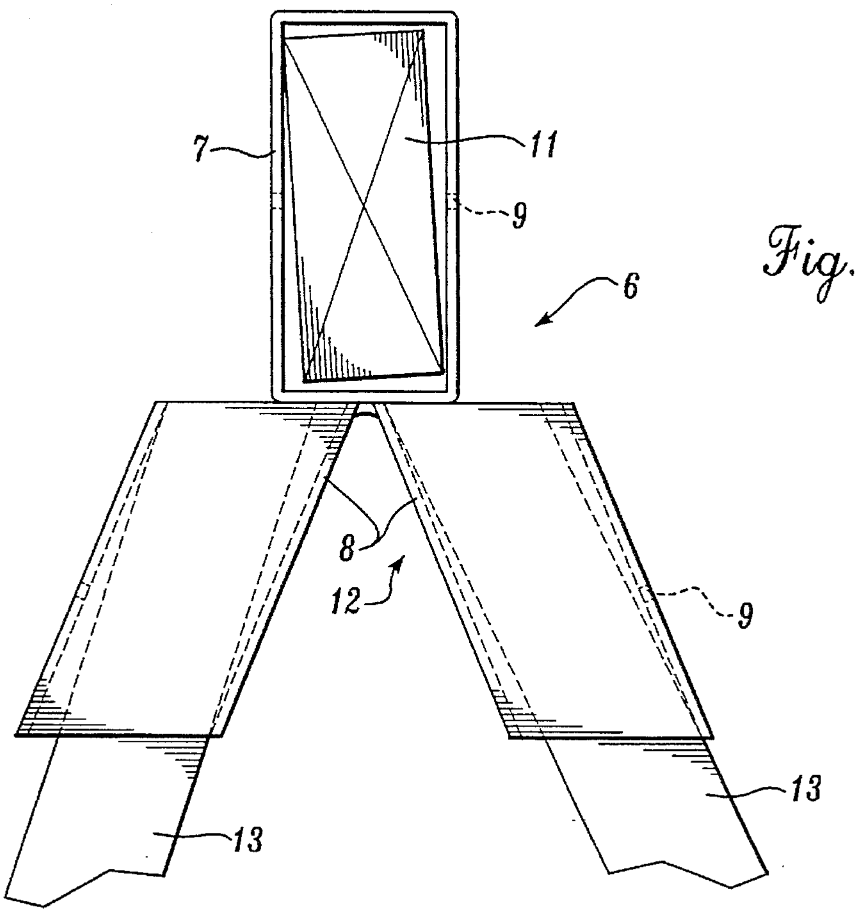
FIG. 7 is an end view of the trestle of FIG. 6, illustrating the loose fit of the cross members and legs within a connector of the present invention.

The connector 12, because of the rather loose fit of the legs 13 and the cross member 11 into their respective sockets and sleeve, will not experience the torsional racking commonly found in more rigid systems on moderately uneven terrain, hence, the sawhorse, barricade, trestle or the like is not prone to premature failure. FIG. 7 illustrates the loose fit of the cross member 11 and leg members 13 in the oversized sleeve 7 and leg sockets 8 of the connector 12. This allows the leg members 13 and cross member 11 to move slightly within the connector 12, permitting the sawhorse 6 to flex and conform to uneven terrain to prevent tipping.

Because of the unique socket and sleeve configuration, nails, pins or other fasteners are used only to hold the various components of the sawhorse 6 together until the connector 12 is loaded. The loads are not dependent upon the fasteners or pins. The connectors 12 thus provide great reliability and versatility, without ultimate dependence upon the fasteners.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A connector for use in assembling a sawhorse having an elongated cross member and at least first and second elongate leg members, the connector comprising:
   - a rectangular tubular center sleeve defining a flat bottom wall and an interior passage having a longitudinal axis, the interior passage capable of receiving an end of the cross member; and
   - first and second rectangular tubular sockets, each socket defining an interior passage having a longitudinal axis, an oblique upper end and an oblique lower end defining an aperture, the first and second sockets secured in opposing angular disposition centrally below the center sleeve so that the longitudinal axes of the first and second sockets are disposed radially relative to the longitudinal axis of the center sleeve, with the oblique upper ends of the first and second tubular sockets abutting and being secured to the flat bottom wall of the center sleeve and extending on either side beyond the bottom wall of the center sleeve, each of the first and second sockets capable of receiving an end of one of the first and second leg members, respectively, within the lower end apertures, so that the received ends of the first and second leg members bear against the bottom wall of the center sleeve.

2. The connector of claim 2, wherein the first and second sockets are oversized relative to the received ends of the first and second leg members for a loose fit.

3. The connector of claim 3, wherein the center sleeve is oversized relative to the cross member for a loose fit.

4. The connector of claim 2, wherein the center sleeve is welded to the first and second tubular sockets.

* * * * *

UNITED STATES PATENT AND TRADEMARK OFFICE
CERTIFICATE OF CORRECTION

PATENT NO. : 5,484,037
DATED : January 16, 1996
INVENTOR(S) : A.F. Neumarkel

It is certified that error appears in the above-identified patent and that said Letters Patent is hereby corrected as shown below:

| COLUMN | LINE | |
|---|---|---|
| [76] (pg. 1, col. 1) | Inventor | "706 10th St., Mukilteo, Wash. 98275" should read --1806 Highland Drive Anacortes, WA 98221-- |
| [57] (pg. 1, col. 2) | ABSTRACT | "mid" should read --and-- |
| 3 | 1 | "FIGS. 2;" should read --FIGURE 2;-- |
| 5 (Claim 2, | 5 line 1) | "2," should read --1-- |
| 6 (Claim 3, | 1 line 1) | "3," should read --2-- |

Signed and Sealed this

Sixth Day of August, 1996

*Attest:*

BRUCE LEHMAN

*Attesting Officer*

*Commissioner of Patents and Trademarks*